United States Patent [19]
Westphal et al.

[11] Patent Number: 5,499,550
[45] Date of Patent: Mar. 19, 1996

[54] RACK-AND-PINION STEERING FOR MOTOR VEHICLES

[75] Inventors: Paul Westphal, Stemwede; Reinhard Buhl, Bohmte, both of Germany

[73] Assignee: Lemförder Metallwaren AG, Lemförde, Germany

[21] Appl. No.: 306,624

[22] Filed: Sep. 15, 1994

[51] Int. Cl.⁶ ................................................ B62D 5/22
[52] U.S. Cl. .................. 74/422; 74/18.2; 74/498; 180/79; 280/96
[58] Field of Search ............. 74/422, 18.2, 498; 180/148, DIG. 18, 79; 280/96; 403/76, 122, 134

[56] References Cited

U.S. PATENT DOCUMENTS

| | | | |
|---|---|---|---|
| 3,926,070 | 12/1975 | Busso | 74/498 |
| 3,927,576 | 12/1975 | Colletti | 74/498 |
| 3,995,502 | 12/1976 | Jones | 74/18.2 |
| 4,301,691 | 11/1981 | Walter | 74/422 |
| 4,522,419 | 6/1985 | Yoshida et al. | 280/96 |
| 4,639,159 | 1/1987 | Amrath | 74/18.2 X |
| 4,721,175 | 1/1988 | Butler | 180/148 |
| 4,986,382 | 1/1991 | Harrison | 180/148 |
| 5,069,080 | 12/1991 | Simon | 74/422 |

*Primary Examiner*—Charles A. Marmor
*Assistant Examiner*—Troy Grabow
*Attorney, Agent, or Firm*—McGlew and Tuttle

[57] ABSTRACT

A rack-and-pinion steering is presented, in which an at least partially hollow cylindrical rack is used to ventilate and evacuate the bellows and in which at least one evacuation groove is prepared in the connection pin of the ball joint housing. The evacuation groove feeds or removes the air from the interior of the bellows via the hollow cylindrical rack corresponding to the direction of movement of the steering system.

11 Claims, 1 Drawing Sheet

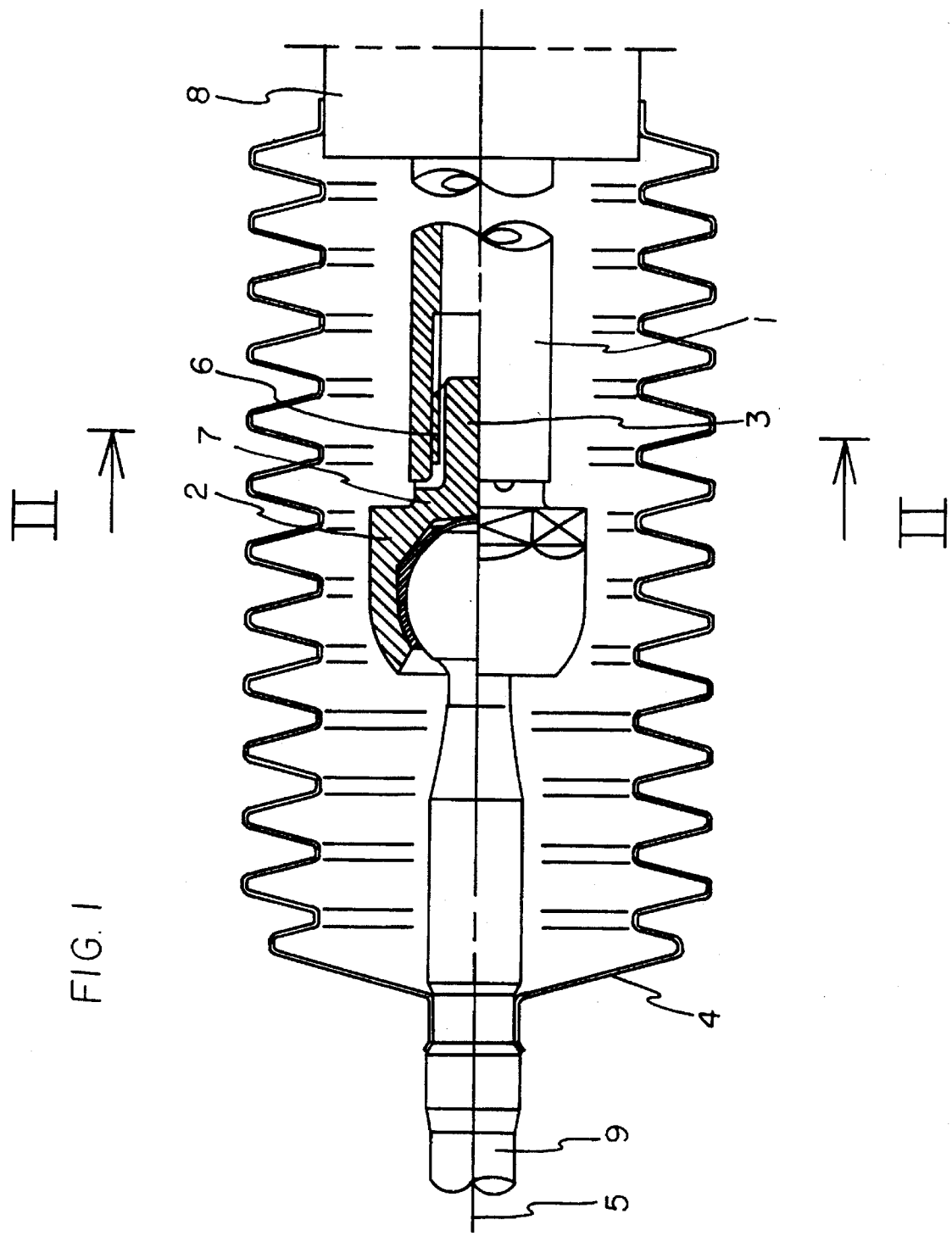

5,499,550

RACK-AND-PINION STEERING FOR MOTOR VEHICLES

FIELD OF THE INVENTION

The present invention pertains to a rack-and-pinion steering for motor vehicles including a ball joint with a ball pin which forms an end piece of the steering tie rod and a ball joint housing in which a bearing shell is used to mount the ball pin, a rack guide housing is provided and a rack is provided guided within the rack guide housing, the rack being fastened to the ball joint housing and wherein a bellows is provided in sealing contact with rack guide housing and with the ball pin.

BACKGROUND OF THE INVENTION

Rack-and-pinion steering have been known to be sealed by bellows against environmental effects and contamination. To guarantee the highest possible level of safety, which is necessary especially in the area of the steering of motor vehicles, tightness of the bellows must be guaranteed over a long period of time in order to keep contaminants away from the sensitive safety components of the steering system. The bellows are exposed to the continual movements of the steering system. The enclosed air cannot be drawn in or removed without auxiliary means, so that air lines intended specifically for this purpose frequently must be incorporated in the system. Designs in which the rack is at least partially a hollow profile have also been known. Holes, which establish a connection between the interior of the rack housing and the hollow rack, are provided in the area of the hollow profile of the rack in this case. Since a rack-and-pinion steering is provided with sealing bellows on both sides, this ventilation and evacuation is also provided on both sides, so that the pressure is equalized between the sealing bellows. There is no direct connection to the environment. However, contaminants within the system often lead to clogging of the evacuation holes. The contaminants may be formed from, e.g., abraded particles or lubricating grease. The clogging of the evacuation holes consequently leads to continuous changes in air pressure within the bellows during movements of the steering system. These permanent suction and pressure effects may lead to the development of leaks at the contact areas of the bellows.

SUMMARY AND OBJECTS OF THE INVENTION

It is an object of the present invention to develop a rack-and-pinion steering system for use in motor vehicles, which makes it possible to ventilate and evacuate the bellows sealing it in a simple manner and thus which provides for pressure equalization over the entire range of movement of the steering system.

The rack-and-pinion steering system according to the invention comprises of a rack guide housing and of a rack movably mounted therein, which is advantageously at least partially hollow cylindrical. This hollow cylindrical area may extend at least over the contact area of the bellows with the rack housing in the axial direction of the rack in order to make it possible to remove the air. The rack is fastened on both sides to a ball joint housing. This ball joint housing is used to movably mount a ball pin, which forms the end piece of a steering rod. The ball joint housing advantageously has an axial connection pin, which passes over into a radial flange on the housing side. A radial connection of the connection flange is also within the scope of the object of the invention. The rack is detachably connected to the connection pin. In the simplest case, this is achieved via external threads, which are cut on the connection pin or are prepared by material deformation, e.g., thread rolling. However, there are also numerous other possibilities of connection, e.g., spot welding, tensioning, etc. After the rack has been mounted, it comes into contact with the radial flange of the connection pin. At least one groove, which passes over onto the connection pin and thus establishes a continuous connection between the interior of the bellows and the hollow cylindrical toothed shaft, is provided in the radial flange.

The pressure equalization within the bellows is achieved by the air being able to flow through this evacuation groove. An improvement in the effect is achieved by a plurality of evacuation grooves. These may extend in the axial direction. For manufacturing reasons, the evacuation grooves should be arranged in a spiral pattern if a rolling method, e.g., thread rolling, is used to prepare the threads.

The design of a rack-and-pinion steering according to the present invention makes it possible to optimize the sealing function of the bellows.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 shows a partial section of a toothed segment steering and

FIG. 2 shows the section II—II according to FIG. 1.

DETAILED DESCRIPTION OF THE PREFERRED EMBODIMENTS

FIG. 1 shows a rack-and-pinion steering, whose rack 1 is guided in a rack guide housing 8. The partially hollow cylindrical rack 1 is detachably fastened to the ball joint housing 2. This is achieved in the design shown by screwing the rack 1 to an axial connection pin 3 of the ball joint housing 2. The ball joint housing is used to movably mount a ball pin 9, which forms the end piece of a steering rod. The ball pin is mounted in a known manner, e.g., via a bearing shell made of plastic. The connection pin 3 is connected in one piece to the ball joint housing 2, and it has external threads, which are advantageously prepared by material deformation, e.g., by thread rolling. The hollow cylindrical rack 1 is provided with corresponding internal threads. After mounting, the hollow cylindrical rack is in contact with the radial flange 7, into which the connection pin 3 passes over on the ball joint side. The steering joint of axial design shown is completely sealingly surrounded by a bellows 4. The bellows prevents contaminants from penetrating into the area of the rack guide housing. Without corresponding evacuation means, undesired deformations or even leaks of the bellows will develop due to the movements of the steering and the necessary tightness of the bellows. Therefore, as is shown in FIG. 1, evacuation grooves 6 are provided according to the present invention in the connection pin 3. The grooves pass over into the radial flange 7 of the connection pin 3, and thus they permit air to be removed from and fed into the interior of the bellows via the hollow rack 1 to the evacuation hole of the rack, which thus establishes a connection to the opposite sealing bellows. (The rack guide housing extends to the opposite side wherein the structure is the mirror image of what is shown.) The advantage of the present invention is the fact that it is now possible to provide the evacuation hole in the rack in an area which remains free from contaminants with certainty. This area may be, e.g., behind the seals of the steering gear.

FIG. 2 shows a section through the connection pin 3 of the ball joint housing 2. The evacuation grooves 6, which extend axially or spirally when viewed in the axial direction of the connection pin, are recognizable here.

While a specific embodiment of the invention has been shown and described in detail to illustrate the application of the principles of the invention, it will be understood that the invention may be embodied otherwise without departing from such principles.

What is claimed is:

1. Rack-and-pinion steering for motor vehicles, comprising:
    a ball pin, which forms an end piece of a steering tie rod and a ball joint housing having a bearing shell for receiving said ball pin to define a ball joint;
    a rack guide housing;
    a rack formed of at least partially as a hollow cylinder, said rack being guided within said rack guide housing;
    a bellows in sealing contact on one side with said rack guide housing and in sealing contact on another side with said ball pin; and
    a connection pin connecting said hollow cylindrical rack to said ball joint housing, said connection pin and said hollow cylindrical rack defining air passage means for equalizing differences in pressure developing within said bellows due to movement of said rack.

2. Rack-and-pinion steering for motor vehicles according to claim 1, wherein said connection pin extends concentrically to a central axis, in an axial direction, said connection pin being connected in one piece to said ball joint housing, said connection pin having a radial flange on a side of said ball joint housing.

3. Rack-and-pinion steering for motor vehicles in accordance with claim 1, wherein said air passage means includes at least one evacuation groove formed in said connection pin, said connection pin having a radial flange, said evacuation groove extending through said radial flange.

4. Rack-and-pinion steering for motor vehicles in accordance with claim 2, wherein said air passage means includes at least one evacuation groove formed in said connection pin, said evacuation groove extending through said radial flange.

5. Rack-and-pinion steering for motor vehicles in accordance with claim 1, wherein said air passage means includes a plurality of evacuation grooves defined in said connection pin, said connection pin having a radial flange, said evacuation grooves extending through said radial flange.

6. Rack-and-pinion steering for motor vehicles in accordance with claim 2, wherein said air passage means includes a plurality of evacuation grooves defined in said connection pin, said evacuation grooves extending through said radial flange.

7. Rack-and-pinion steering for motor vehicles in accordance with claim 5, wherein said evacuation grooves extend axially along a surface of said connection pin.

8. Rack-and-pinion steering for motor vehicles according to claim 3, wherein said evacuation groove extends axially along a surface of said connection pin.

9. Rack-and-pinion steering according to claim 5, wherein said evacuation grooves extend spirally along a surface of said connection pin.

10. Rack-and-pinion steering according to claim 3, wherein said evacuation groove extends spirally along a surface of said connection pin.

11. Rack-and-pinion steering for motor vehicles in accordance with claim 5, wherein said air passage means equalizes the pressure in the bellow with the atmospheric pressure via said evacuation grooves formed in the connection pin and via a passage formed in the hollow cylindrical rack, upon movement of said rack.

* * * * *